US007363851B2

(12) United States Patent
Souliere et al.

(10) Patent No.: US 7,363,851 B2
(45) Date of Patent: Apr. 29, 2008

(54) SPACERS FOR USE WITH ACTUATOR CASINGS

(75) Inventors: Ernest George Souliere, Rochester, NH (US); Kenneth Alan Blade, Amesbury, MA (US); Dennis Eugene O'Hara, Strafford, NH (US)

(73) Assignee: Fisher Controls International, LLC, Marshalltown, IA (US)

( * ) Notice: Subject to any disclaimer, the term of this patent is extended or adjusted under 35 U.S.C. 154(b) by 198 days.

(21) Appl. No.: 11/336,220

(22) Filed: Jan. 20, 2006

(65) Prior Publication Data

US 2007/0169622 A1 Jul. 26, 2007

(51) Int. Cl.
*B23P 11/00* (2006.01)
*F01B 19/00* (2006.01)

(52) U.S. Cl. ...................... 92/171.1; 92/94; 29/888.06

(58) Field of Classification Search .................... 92/59, 92/63, 64, 94, 98 D, 99, 169.1, 171.1, 169.4; 29/888.06
See application file for complete search history.

(56) References Cited

U.S. PATENT DOCUMENTS 3,064,685 A 11/1962 Washnock et al.
3,385,172 A 5/1968 Kaminga
3,571,883 A * 3/1971 Doolittle .................. 29/888.06
3,838,630 A * 10/1974 Kobelt .......................... 92/99
4,522,111 A 6/1985 Kobelt
5,167,182 A 12/1992 Sims
6,840,154 B2 * 1/2005 Modinger et al. ......... 92/171.1
2003/0172806 A1 9/2003 Modinger

OTHER PUBLICATIONS

International Search Report Corresponding to International Application PCT/US2007/000865 mailed Jun. 6, 2007, 5 pages.
Written Opinion of the International Searching Authority Corresponding to International Application PCT/US2007/000865 mailed Jun. 6, 2007, 6 pages.

* cited by examiner

*Primary Examiner*—Thomas E. Lazo
(74) *Attorney, Agent, or Firm*—Hanley, Flight & Zimmerman, LLC

(57) ABSTRACT

Spacers for use with actuator casings are disclosed. An example spacer includes a ring-shaped member defining a central opening and configured to form a part of an actuator casing and to space first and second actuator casing portions a predetermined distance when the first and second casing portions are coupled to the ring-shaped member. The ring-shaped member includes a first surface surrounding the central opening configured to engage the first casing portion and a second surface surrounding the central opening configured to engage the second casing portion. Each of the first and second surfaces includes a plurality of apertures configured to receive threaded fasteners to attach the first and second actuator casing portions to the ring-shaped member.

23 Claims, 9 Drawing Sheets

SPACERS FOR USE WITH ACTUATOR CASINGS

FIELD OF THE DISCLOSURE

The present disclosure relates generally to actuators and, more specifically, to spacers for use with actuator casings.

BACKGROUND

Process control systems often employ pneumatic actuators to operate fluid valves as well as other process control devices. Pneumatic actuators typically include a spring casing having upper and lower casing halves between which a diaphragm is captured. An actuator shaft or rod is typically coupled to the diaphragm so that movements of the diaphragm cause corresponding movements of the actuator rod. In turn, if the actuator rod is coupled to, for example, a fluid valve, the movements of the actuator rod may be used to control the position of a fluid flow control member (e.g., a plug) within the valve and, thus, the fluid flowing through the valve.

One or more springs within the spring casing bias the diaphragm and the actuator rod toward a known position and pressurized air may be applied to one side of the diaphragm via a port in one of the casing halves to move the diaphragm and actuator rod against the forces applied by the spring(s). Thus, the springs provide a return force to enable bi-directional movement and control (e.g., open/close control, modulating control, etc.) of the diaphragm and actuator rod positions via a single pressure signal to the actuator.

Typically, the spring casing of a pneumatic actuator includes upper and lower casing halves that are made of stamped, forged, or cast metal. Each of the casing halves typically has an internal cavity with a depth or height that enables the assembled casing halves to accommodate the height of the springs in a desired biased (i.e., partially compressed) condition within the assembled spring casing. Thus, as larger, more powerful springs are needed to satisfy certain applications, the length of the springs needed tends to increase, which requires an increased depth or height of the internal cavities within the casing halves. However, simply increasing the depth or height of the internal cavities within the casing halves can be problematic. For example, in the case where a stamping, forging, or casting process is used to fabricate casing halves, the depth of the casing halves cannot be increased without practical limitation. In particular, as the desired depth of a casing increases, the cost of manufacturing the casing may increase and may become cost prohibitive. Alternatively or additionally, beyond a certain casing depth, it may not be possible to use a stamping, forging, or casting process to fabricate the casing halves. For example, beyond a certain depth or height, it may not be possible to easily remove a casing half from the tool used to fabricate the casing half. In other words, the tool may be jammed when the casing half becomes stuck on the tool.

SUMMARY

Figure 1:
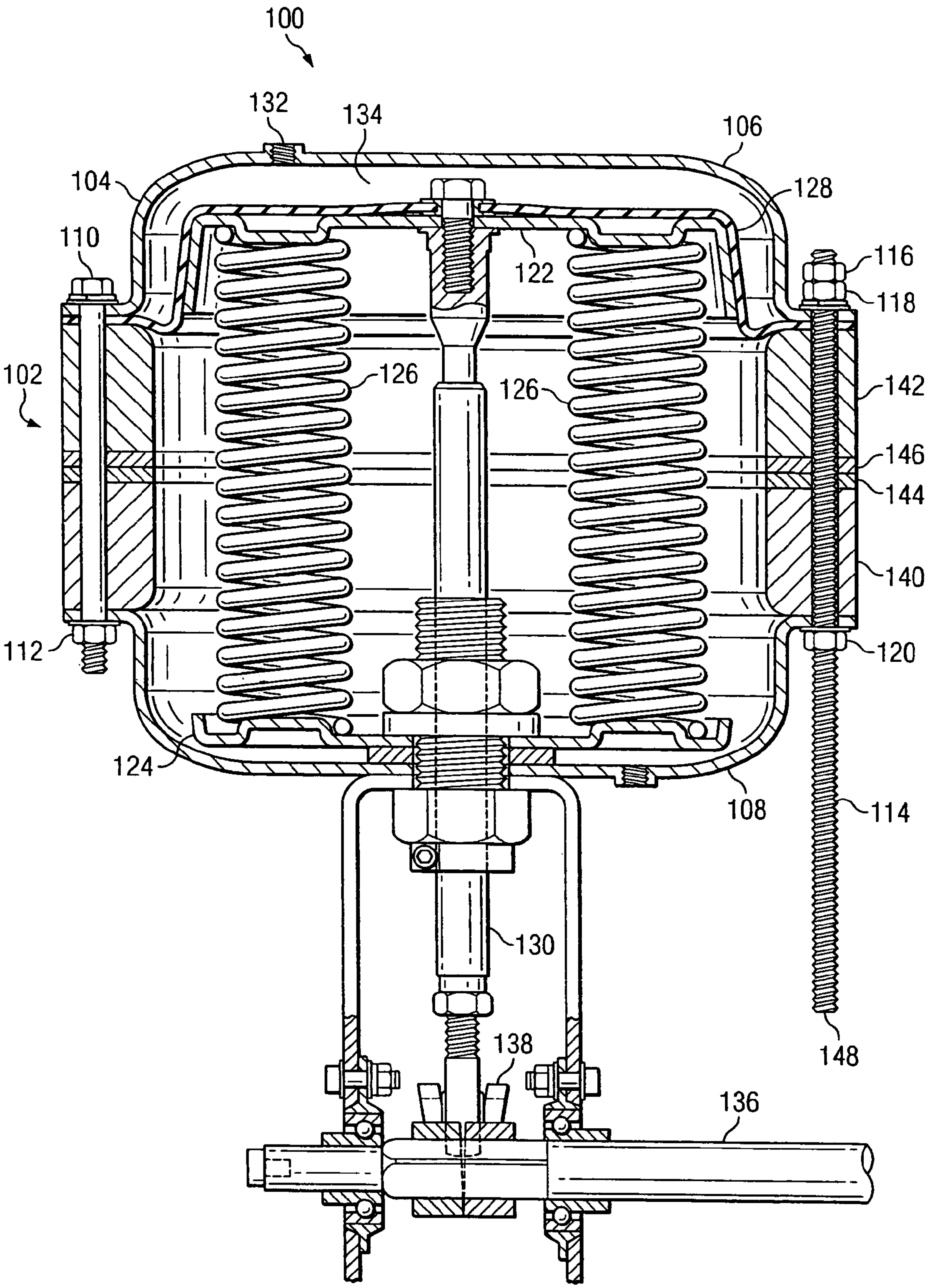
FIG. 1 is a cross-sectional view depicting an example actuator incorporating an example spacer.

In one example embodiment, a spacer for use with an actuator casing includes a ring-shaped member defining a central opening and configured to form a part of an actuator casing and to space first and second actuator casing portions a predetermined distance when the first and second casing portions are coupled to the ring-shaped member. The ring-shaped member includes a first surface surrounding the central opening configured to engage the first casing portion and a second surface surrounding the central opening configured to engage the second casing portion. Each of the first and second surfaces includes a plurality of apertures configured to receive threaded fasteners to attach the first and second actuator casing portions to the ring-shaped member.

In another example embodiment, a spacer for use with an actuator casing includes a cylindrical portion having a first end, a second end, and a longitudinal passage extending between the first and second ends. The spacer further includes a first flange adjacent to the first end and a second flange adjacent to the second end. The first flange includes a plurality of threaded apertures, each of which is opposite a respective aperture in the second flange.

In yet another example embodiment, an actuator casing includes a first casing portion, a second casing portion, and a spacer coupled between the first and second casing portions. The spacer includes a plurality of threaded apertures configured to receive fasteners extending through the first and second casing portions.

DETAILED DESCRIPTION

The example spacers described herein may be advantageously used within actuator casings to enable the cost effective manufacture of, for example, a spring casing having an internal cavity or chamber with a depth or height that accommodates longer, more powerful springs than those typically used with known spring-biased actuators (e.g., spring return pneumatic actuators).

In general, the example spacers described herein include one or more cylindrical and/or ring-shaped members or bodies made substantially of metal or plastic and having apertures configured to receive threaded fasteners such as, for example, threaded rods, bolts, and/or internally threaded members or inserts. Also, generally, the apertures are aligned with corresponding holes or apertures in first (e.g., upper) and second (e.g., lower) actuator casing portions. In this manner, a spacer may be disposed between the first and second casing portions, the apertures of the first casing portion, the second casing portion, and the spacer may be aligned, and threaded fasteners may be used in the apertures to couple the casing portions to the spacer to form a spring casing having an internal cavity with a height or depth greater than may otherwise be achievable using only known upper and lower casings fabricated via known stamping, forging, or casting processes.

In the case where the ring-shaped or cylindrical bodies or members are made substantially of metal, the threaded apertures therein may be formed directly from the metal ring-shaped body or member. However, in the case where the ring-shaped or cylindrical bodies or members are made substantially of plastic, the threaded apertures therein may be formed using threaded metal inserts that are insert-molded (i.e., molded together) with the plastic body or which are inserted into openings in the plastic body after the plastic body is molded or otherwise formed.

The free length (i.e., uncompressed length) of the springs used within an actuator casing may be significantly greater than the depth or height of the internal cavity of a fully assembled actuator spring casing. As a result, it is desirable to configure the spring casing in a manner that permits safe assembly and disassembly of the actuator casing (e.g., in the case that field service of the actuator casing is desirable). Thus, the spacers disclosed herein enable a spring casing to be assembled so that the springs can be slowly compressed from their free length to a preloaded condition as the spring casing portions and spacer are drawn together to form the assembled actuator casing. Likewise, the spacers disclosed herein enable the spring casing to be disassembled (e.g., in the field for servicing) in a manner that permits the springs to be slowly decompressed or unloaded to a substantially uncompressed condition before the actuator casing portions can separate. In other words, the spacers described herein enable an actuator spring casing to be assembled and disassembled in a safe manner that prevents the possibility of a sudden release of spring energy via, for example, a sudden separation of the casing portions while one or more springs are in a compressed condition.

Now turning to FIG. 1, a cross-sectional view depicting an example actuator 100 incorporating an example spacer 102 is provided. In general, the example actuator 100 is a pneumatically operated spring return actuator configured for use with a rotary valve or the like. However, it should be understood that the example spacer 102 could be used in connection with other types of actuators configured for use in other types of applications. For example, the example spacer 102 could alternatively be used with an actuator configured for use with a sliding stem valve.

As shown in FIG. 1, the example actuator 100 includes a housing or spring casing 104, which includes a first or upper spring casing 106 and a second or lower spring casing 108. The casings 106 and 108 are coupled or joined to the spacer 102 via fasteners 110, 112, 114, 116, 118, and 120. In the example of FIG. 1, the fasteners 110 and 112 are depicted as a threaded bolt and nut, respectively, where the length of the bolt 110 has been selected so that it protrudes only slightly from the nut 112 when the casing 104 is fully assembled. In contrast, the fastener 114 is depicted as a threaded rod that is secured to the casing 104 via the nuts 116, 118, and 120. As described in greater detail below, the length of the threaded rod 114 is selected to enable the actuator 100 to be assembled and disassembled in a manner that prevents the sudden release of spring energy. In the example of FIG. 1, a substantial portion of the length of the threaded rod 114 protrudes from the nut 120 when the casing 104 is fully assembled.

The example actuator 100 further includes a first or upper spring plate 122 and a second or lower spring plate 124 between which springs 126 are captured. A diaphragm 128 lies adjacent to the upper spring plate 122 and is sealingly captured between the upper casing 106 and the spacer 102. An actuator shaft or rod 130 is coupled to the upper spring plate 122 and the diaphragm 128 so that movement of the diaphragm 128 and the spring plate 122 causes a corresponding movement of the actuator rod 130. In the example of FIG. 1, the springs 126 are partially compressed or preloaded at the time the actuator 100 is assembled and, as a result, the springs 126 bias or urge the spring plate 122 and the diaphragm 128 toward the casing 106 and tend to draw the actuator rod 130 into the casing 104.

The application of a pressure signal (e.g., pressurized air) to a port 132 may be used to increase the pressure in a chamber 134 to move the diaphragm 128, the spring plate 122, and the actuator rod 130 away from the upper casing 106 against the force of the springs 126 (i.e., the springs 126 are further compressed). As the actuator rod 130 extends downward or away from the casing 106, the rod 130 rotates a valve shaft 136 via a linkage 138.

Turning in more detail to the example spacer 102, FIG. 1 depicts the example spacer 102 as including a plurality of ring-shaped members 140, 142, 144, and 146 that have been stacked to provide a desired height or depth to accommodate the springs 126. One or more of the ring-shaped members 140, 142, 144, and 146 may be fabricated from, for example, readily available metal plate(s). In particular, metal plates having readily available thicknesses may be used to create a spacer having a desired overall height to space the casings 106 and 108 a predetermined distance apart. For example, the ring-shaped members 140 and 142 may be fabricated using two inch thick metal plate and the ring-shaped members 144 and 146 may be fabricated using quarter inch thick metal plate so that the spacer 102 has an overall or total height of four and a half inches. However, more or fewer ring-shaped members made using any desired material thickness(es) may be used to achieve any desired height for the spacer 102. For example, a single ring-shaped member having the desired height may replace the ring-shaped members 140, 142, 144, and 146. Alternatively, one or more of the members 140, 142, 144, and 146 may be eliminated and/or the thickness(es) or height(s) of one or more of the members 140, 142, 144, and 146 may be increased or decreased.

Each of the ring-shaped members 140, 142, 144, and 146 includes a plurality of apertures configured to receive the fasteners 110 and 114. The apertures are circumferentially spaced about the ring-shaped members 140, 142, 144, and 146. Additionally, the apertures of each of the ring-shaped members 140, 142, 144, and 146 are coaxially aligned with the apertures of the other ring-shaped members 140, 142, 144, and 146 to enable the fasteners 110 and 114 to pass through the ring-shaped members 140, 142, 144, and 146 as depicted in FIG. 1. Although only one bolt (i.e., the bolt 110) and one threaded rod (i.e., the rod 114) are shown in FIG. 1, multiple threaded rods and bolts may be used to join the casings 106 and 108 to the spacer 102.

To assemble the actuator 100, the nuts 116 and 118 are counter-tightened or locked against each other at one end of the threaded rod 114. One or more additional threaded rods (not shown) are similarly fitted with counter-tightened nuts. The threaded rods (e.g., the rod 114) have a length that enables the rods to extend through the casings 106 and 108 and the spacer 102 when the springs 126 are in a free or uncompressed state. Nuts (e.g., the nut 120) are threaded onto the ends (e.g., the end 148) of the rods (e.g., the rod 114) and then each of the nuts is gradually tightened to slowly compress the springs 126 and safely draw the casings 106 and 108 and the spacer 102 together. Three or four such rods (e.g., the rod 114) may be used to initially compress the springs 126 and assemble the casing 104. However, more or fewer threaded rods could be used instead. Alternatively, the threaded rods (e.g., the rod 114) and the counter-tightened nuts (e.g., the nuts 116 and 118) could instead be bolts having an appropriate length. However, extended length bolts may be difficult to obtain and/or cost prohibitive in comparison to threaded rods. In any event, once the casings 106 and 108 and the spacer 102 have been initially assembled using the threaded rods (e.g., the threaded rod 114), relatively shorter bolts (e.g., the bolt 110) can then be used to complete the assembly of the casing 104. For example, four or five such bolts may be used in addition to the threaded rods to secure the casings 106 and 106 to the spacer 102.

Disassembly of the casing 104 can be safely accomplished by first removing the relatively shorter bolts (e.g., the bolt 110) and then slowly removing the threaded rods (e.g., the rod 114) by loosening their respective nuts (e.g., the nut 120) in a synchronized manner to gradually relieve the compression or pre-load of the springs 126. Once the nuts (e.g., the nut 120) reach the ends (e.g., the end 148) of their respective rods (e.g., the rod 114), the springs 126 are substantially uncompressed and the rods and the casing 106 can be removed from the actuator 100 to enable, for example, the actuator to be serviced (e.g., to replace the diaphragm 128).

While the example actuator 100 enables safe assembly and disassembly (e.g., in the field) of the casing 104, the configuration shown in FIG. 1 uses a plurality of relatively long threaded rods. Thus, when the casing 104 is fully assembled, a relatively long portion of the threaded rods protrudes from the casing 104. For example, as shown in FIG. 1, the distance between the end 148 of the rod 114 and the nut 120 is relatively large. Such protrusions can be unsightly, are prone to being damaged (e.g., bent) and rendered non-removable, and/or may snag or damage a person's clothing, skin, etc.

Figure 2B:
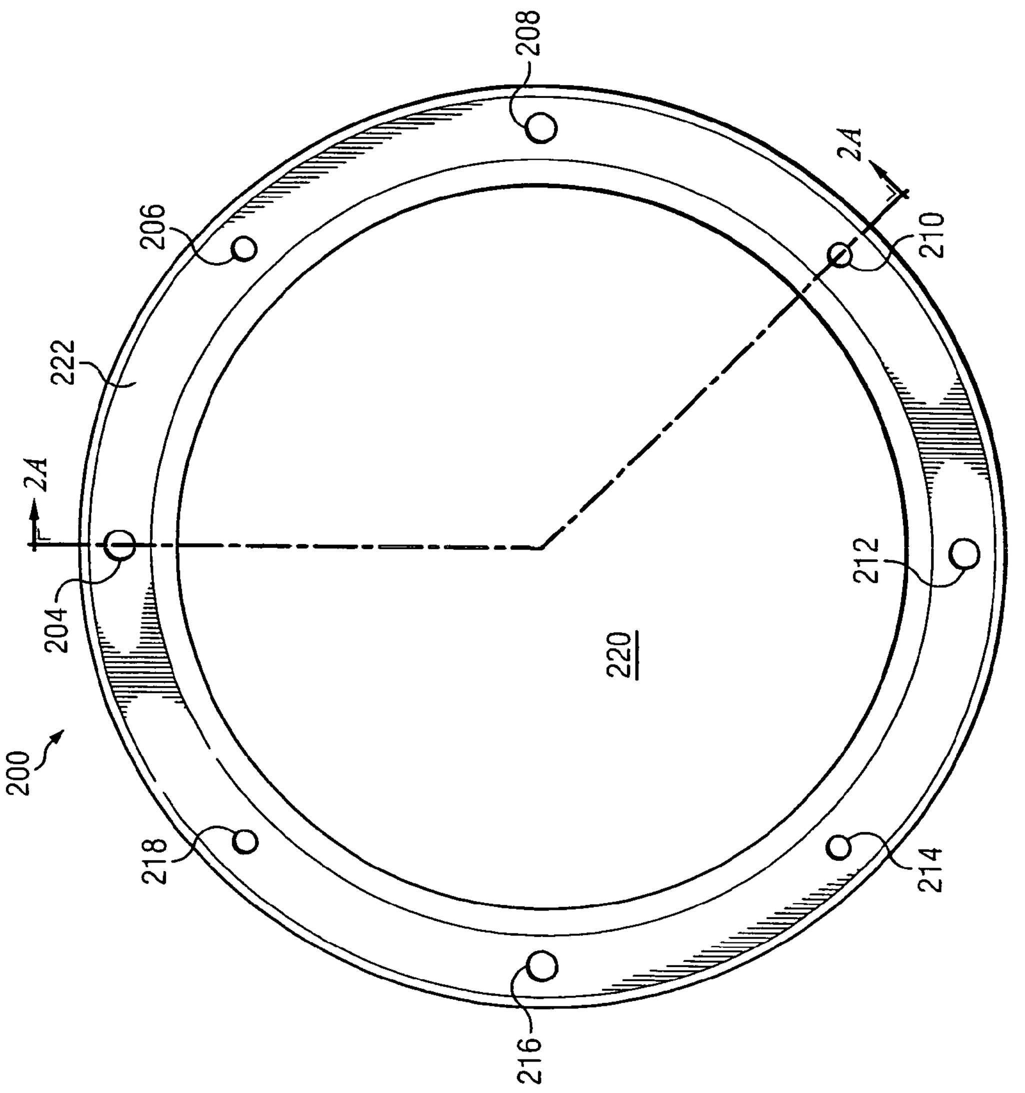
FIG. 2B is a plan view of the example spacer of FIG. 2A.
Figure 2A:
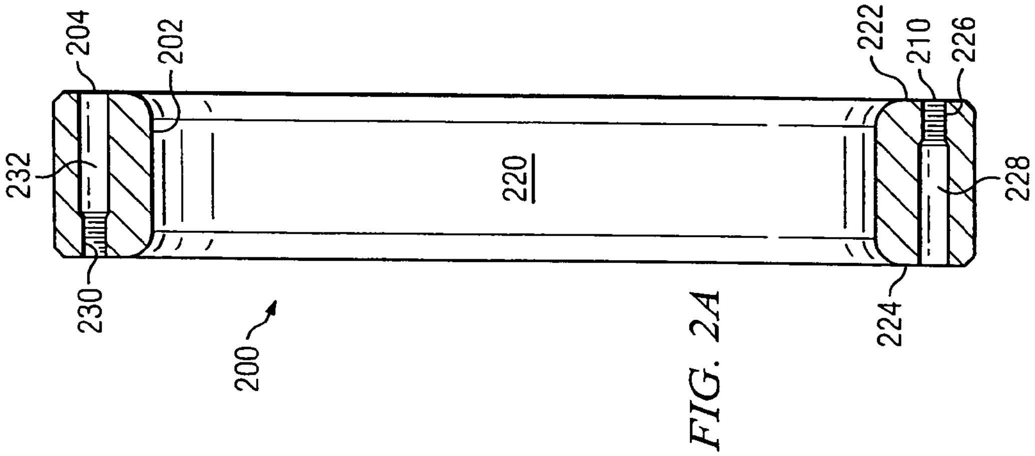
FIG. 2A is a cross-sectional view of another example spacer that may be used with an actuator casing.

FIGS. 2A and 2B depict another example spacer 200 that may be used with an actuator casing. The example spacer 200 may, for example, be used instead of the example spacer 102 of FIG. 1 to eliminate the need to use relatively long threaded rods (e.g., the rod 114). More specifically, the example spacer 200 is a unitary or one-piece ring-shaped member that includes a plurality of at least partially threaded apertures 204, 206, 208, 210, 212, 214, 216, and 218. In the case where the example spacer 200 is sized and configured to be used instead of the spacer 102 for the example actuator 100 (FIG. 1), the partially threaded apertures 204-218 enable relatively shorter (i.e., shorter than the threaded rod 114 of FIG. 1) threaded fasteners to be used to secure the casings 106 and 108 to the spacer 200. For example, as described in greater detail below, only relatively shorter threaded fasteners (e.g., the bolt 110 of FIG. 1) may be used to assemble the casing 104.

Turing in more detail to the example ring-shaped or cylindrically-shaped spacer 200, the partially threaded apertures 204-218 are circumferentially spaced about a central opening or longitudinal passage 220 defined by the spacer 200. More specifically, in the example of FIGS. 2A and 2B, the apertures 204-218 are evenly spaced about first and second circumferential surfaces 222 and 224. However, more or fewer apertures than shown in FIGS. 2A and 2B spaced in any desired manner (e.g., unequal spacing) may be used instead to suit the needs of a particular application.

The apertures 204-218 are partially threaded so that a portion of each of the apertures 204-218 near or adjacent either the first circumferential surface 222 or the second circumferential surface 224 is threaded and the remaining portion is not threaded and, thus, functions to provide passage or clearance to a threaded fastener (e.g., a bolt, threaded rod, etc.). As depicted in the example of FIGS. 2A and 2B, the apertures 204-218 are configured in alternating fashion so that each aperture that is threaded adjacent to the first circumferential surface 222 is adjacent to an aperture that is threaded adjacent to the second circumferential surface 224. More specifically, the apertures 206, 210, 214, and 218 have threaded portions adjacent to the first circumferential surface 222 and the remaining portions of the apertures 206, 210, 214, and 218 are non-threaded. The remaining apertures 204, 208, 212, and 216 have threaded portions adjacent to the second circumferential surface 224 while the remaining portions of these apertures are non-threaded. For example, as can be clearly seen in FIG. 2A, the aperture 210 includes a threaded portion 226 adjacent to the first circumferential surface 222 and a non-threaded portion 228 adjacent to the second circumferential surface 224. Conversely, the aperture 204 includes a threaded portion 230 adjacent to the second circumferential surface 224 and a non-threaded portion 232 adjacent the first circumferential surface 222. While the apertures 204-218 are depicted in FIGS. 2A and 2B as partially threaded, the apertures 204-218 could instead be fully threaded (i.e., to eliminate the non-threaded portions of the apertures 204-218). Alternatively, one or more of the apertures 204-218 could be fully threaded while the remaining apertures are partially threaded.

To assemble the example actuator 100 using the example one-piece or unitary spacer 200 instead of the example multi-piece spacer 102, one of the first or second circumferential surfaces 222 and 224 is disposed on the lower casing 108. Threaded bolts (e.g., such as the threaded bolt 110) are then threaded into the apertures having threaded portions adjacent to the one of the circumferential surfaces 222 and 224 that is in contact with the lower casing 108. For example, if the first circumferential surface 222 is in contact with the lower casing 108, threaded bolts are threaded into the apertures 206, 210, 214, and 218 until the spacer 200 is securely engaged with lower casing 108. The springs 126 and other components of the actuator 100 are assembled into the lower casing 108 and the upper casing 106, the diaphragm 128, and the upper spring plate 122 are placed on springs 126. Threaded bolts (e.g., the threaded bolt 110) are then passed through clearance holes (not shown) in the upper casing 106 and into the ones of the apertures 204-218 having threaded portions adjacent to the one of the circumferential surfaces 222 and 224 facing the upper casing 106. Continuing with the above example in which the first circumferential surface 222 is in contact with the lower casing 108, threaded bolts are passed through the upper casing 106 into the apertures 204, 208, 212, and 216. The threaded bolts engaging the apertures 204, 208, 212, and 216 are then tightened (e.g., in an alternating sequence) to slowly and evenly draw the upper casing 106, the diaphragm 128, and the spring plate 122 toward the lower casing 108 to safely compress the springs 126 and secure the upper casing 106 to the spacer 200. Additionally, although not shown, additional nuts could be counter-tightened (i.e., to function as lock nuts) against the nuts (e.g., the nut 112).

Disassembly of the example actuator 100 incorporating the example spacer 200 can also be accomplished in a safe manner. In particular, the threaded bolts extending through the upper casing 106 into the apertures 204, 208, 212, and 216 are slowly loosened (e.g., in an alternating pattern or sequence) to allow the upper casing 106 to separate from the spacer 200 and to allow the springs 126 to decompress. The threaded bolts used with the apertures 204, 208, 212, and 216 have sufficient lengths so that the springs 126 are substantially or fully decompressed before the threads of the threaded bolts are no longer engaged with the threads of the apertures 204, 208, 212, and 216. As a result, the upper casing 106 can be removed (e.g., in the field) without the risk of a sudden, potentially unsafe, release of spring energy.

As can be appreciated from the foregoing, the example spacer 200 provides fastener engagements (e.g., threads) nearer to the upper and lower casings 106 and 108 and, thus, eliminates the need to use the relatively longer threaded rods or bolts (e.g., the threaded rod 114) that are needed when the example spacer 102 is used. In this manner, the example spacer 200 enables the example actuator 100 to be safely assembled and disassembled using relatively shorter threaded bolts (e.g., such as the threaded bolt 110). Such relatively shorter threaded bolts may also eliminate the relatively long protrusions associated with the threaded rod shown in FIG. 1 and, thus, may substantially reduce or eliminate the snagging, bending, and/or other problems associated with such lengthy protrusions.

Figure 3B:
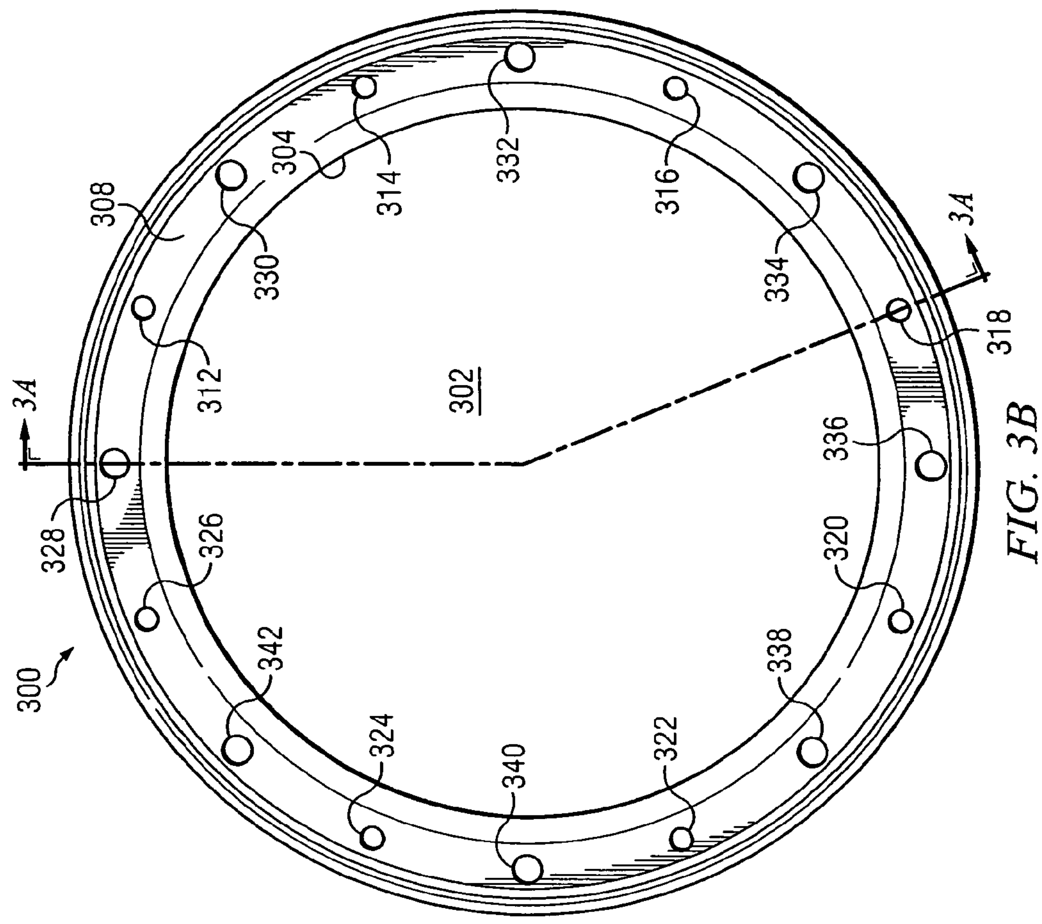
FIG. 3B is a plan view of the example spacer of FIG. 3A.
Figure 3A:
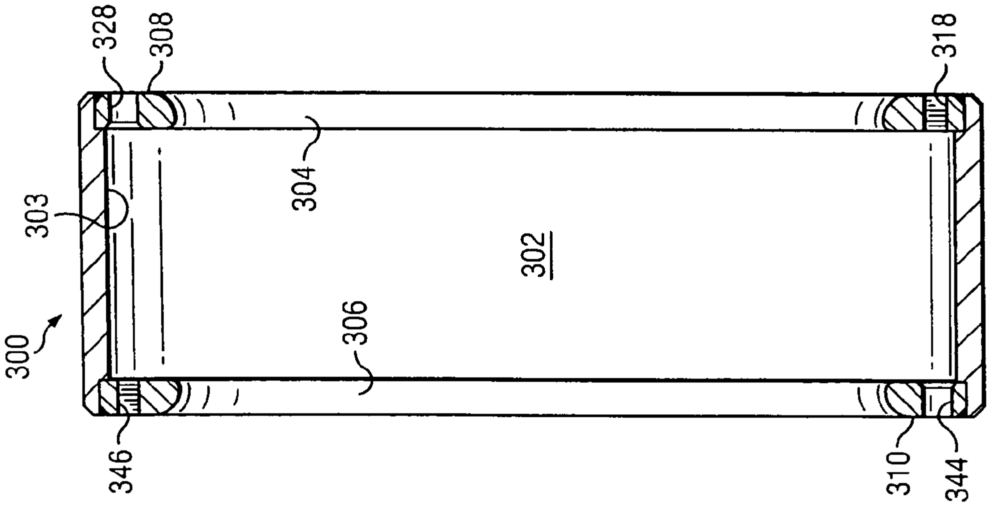
FIG. 3A is a cross-sectional view of another example spacer.

FIGS. 3A and 3B depict another example spacer 300 that may be used instead of the example spacer 102 of FIG. 1. In general, the example spacer 300 is a ring-shaped member or body that having a longitudinal passage or central opening 302. As with the example spacers 102 and 200 described above, the example spacer 300 is configured to space the casings 106 and 108 a predetermined distance when the first and second casing 106 and 108 are coupled to the spacer 300. The example spacer 300 includes a cylindrical portion 303, a first flange 304 that projects inwardly toward the opening 302 and a second flange 306 that projects inwardly toward the opening 302. The first flange 304 has a first circumferential surface 308 surrounding the central opening 302 and configured to engage the upper casing 106 or the lower casing 108. Similarly, the second flange 306 has a second circumferential surface 310 surrounding the central opening 302 and configured to engage the upper casing 106 or the lower casing 108. The first circumferential surface 308 includes a plurality of threaded apertures 312, 314, 316, 318, 320, 322, 324, and 326 configured to receive threaded fasteners (e.g., threaded bolts), and a plurality of non-threaded apertures or clearance holes 328, 330, 332, 334, 336, 338, 340, and 342. Thus, the apertures 312-342 provide an alternating arrangement of threaded and non-threaded apertures in the circumferential surface 308 of the flange 304. The second flange 306 and circumferential surface 310 includes a similar pattern or alternating arrangement of threaded and non-threaded apertures. However, the apertures associated with the second flange 306 are shifted relative to the apertures 312-342 so that each of the threaded apertures 312-326 of the first flange 304 and circumferential surface 308 is opposite or coaxially aligned with a non-threaded aperture of the second flange 306 and circumferential surface 310. Likewise, each of the non-threaded apertures 328-342 of the first flange 304 and circumferential surface 308 is opposite or coaxially aligned with a threaded aperture of the second flange 306 and circumferential surface 310. For example, as shown in FIG. 3A, the threaded aperture 318 of the first flange 304 and circumferential surface 308 is opposite or coaxially aligned with the non-threaded aperture 344 and the non-threaded aperture 328 is opposite or coaxially aligned with the threaded aperture 346 of the second flange 306 and circumferential surface 310.

Figure 4:
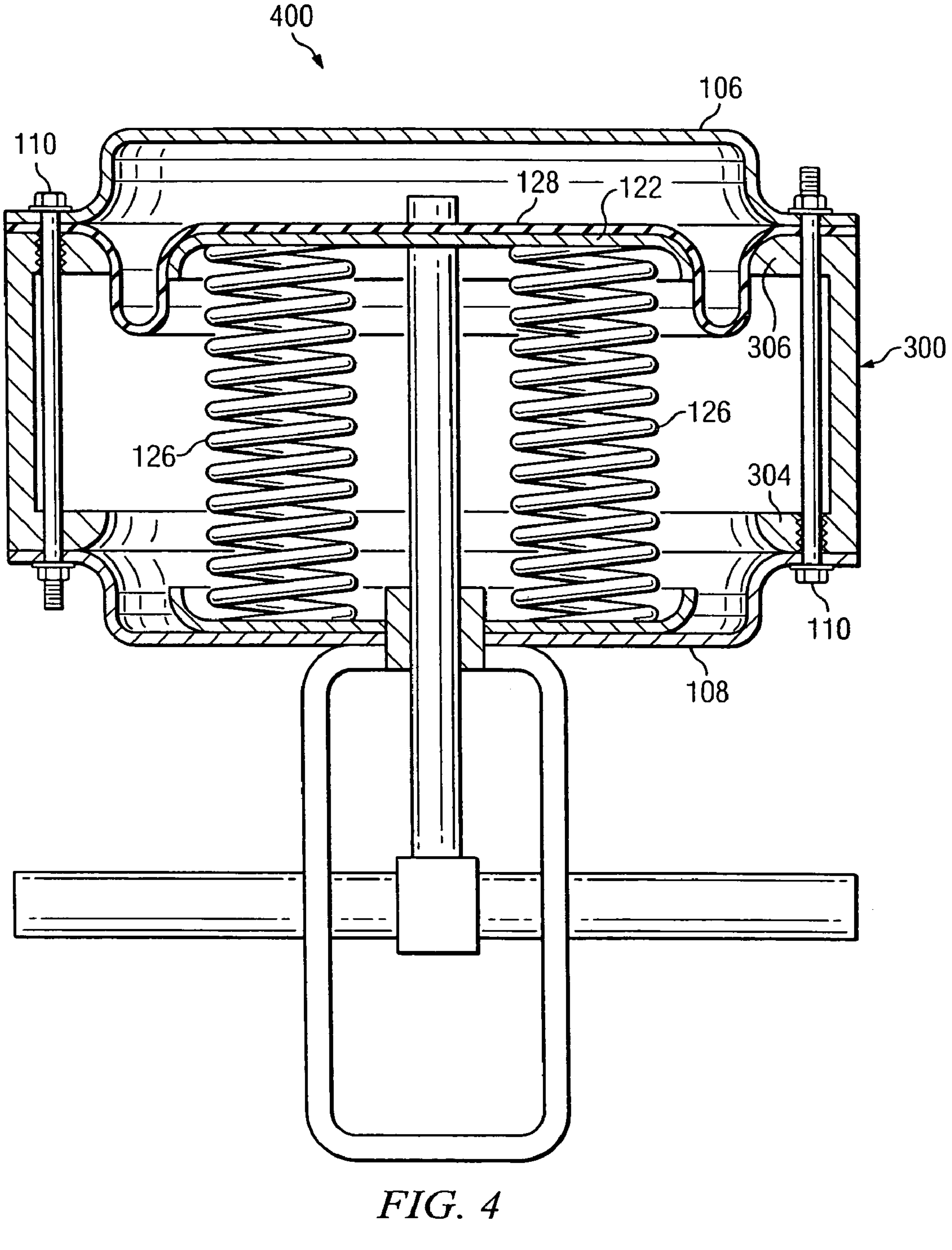
FIG. 4 is a cross-sectional view an actuator incorporating the example spacer depicted in FIGS. 3A and 3B.

FIG. 4 depicts an example actuator 400 that incorporates the example spacer 300 of FIGS. 3A and 3B. In general, the example actuator 400 is similar to the example actuator 100 of FIG. 1 and is assembled and disassembled in a manner similar to that described above in connection with the example spacer 200 of FIGS. 2A and 2B.

The example spacers 102, 200, and 300 described above form part of the actuator casing (e.g., spring casing) and substantially encase or hide the fasteners (e.g., the threaded bolt 110) used to assemble the upper and lower casings to the spacer. However, the example spacer 102 of FIG. 1 results in at least some of the threaded rod 114 being exposed or protruding from the casing 104. In any case, substantially encasing or hiding the fasteners (e.g., from the environment surrounding or external to the actuator casing) used to assemble the actuator casing may be advantageous in some applications. For example, in pharmaceutical applications, food processing applications, etc., actuator housings may be exposed to wash downs involving caustic or corrosive cleaning agents. Such cleaning agents may permanently damage the threaded fasteners used to assemble an actuator casing (e.g., may corrode the threads), thereby impairing or preventing servicing of the actuator. Additionally, encasing or hiding the threaded fasteners may also serve to minimize or eliminate the possibility of one or more of the fasteners from being mechanically damaged (e.g., bent) and, thus, rendered non-removable from the casing. Still further, substantially encasing or hiding the fasteners may improve the aesthetics of the actuator.

While all of the example spacers 102, 200, and 300 substantially encase or hide fasteners used to assemble actuator casings to the spacers, the example spacers 200 and 300 also enable relatively shorter threaded bolts to be used for all of the casing fasteners (i.e., do not require the use of relatively long sections of threaded rod). As a result, use of the example spacers 200 and 300 results in a substantial reduction in the degree to which the ends of the threaded fasteners protrude from the casing(s). In some examples, the threaded fasteners may be sized so that their ends are substantially flush or recessed and, thus, result in no protrusion from the casing(s).

Figure 5B:
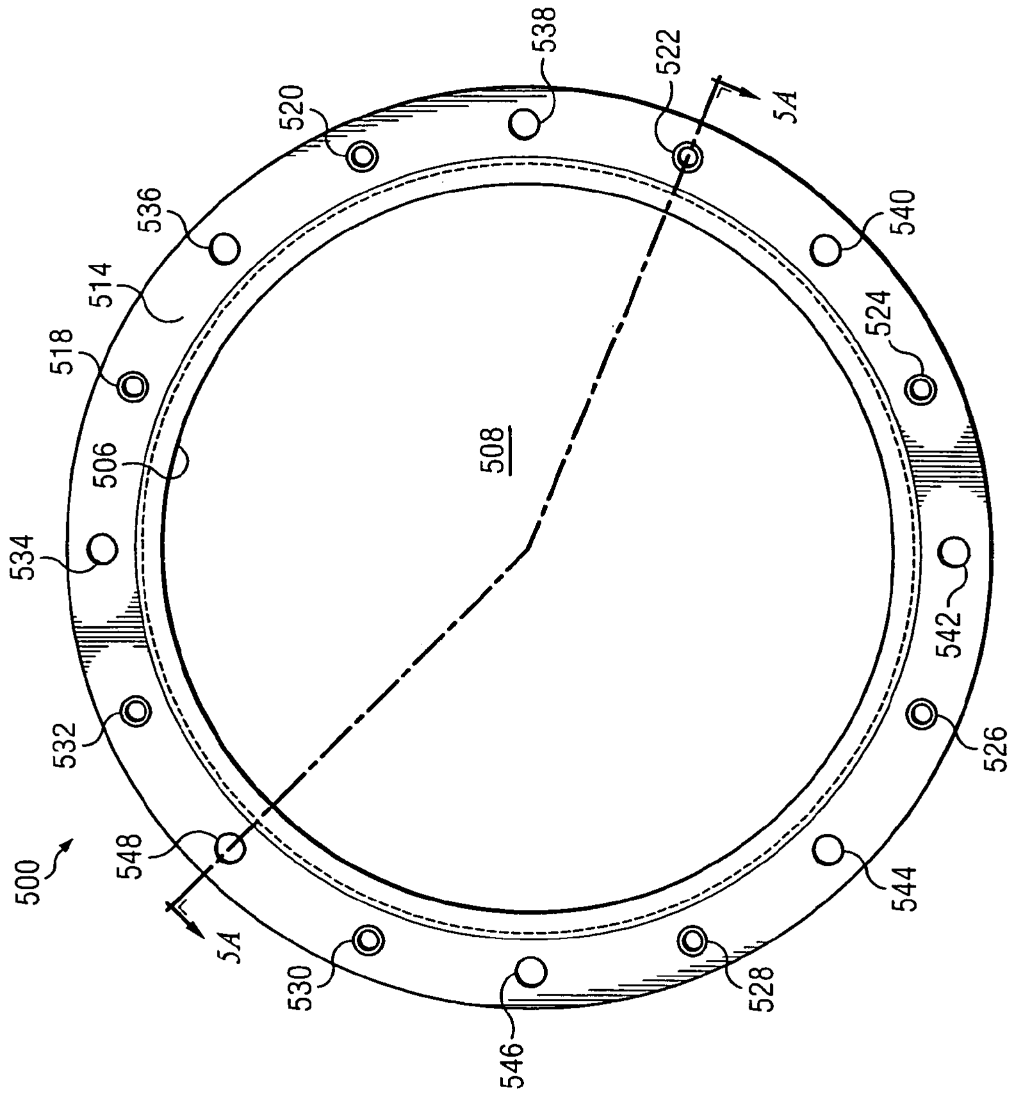
FIG. 5B is a plan view of the example spacer of FIG. 5A.
Figure 5A:
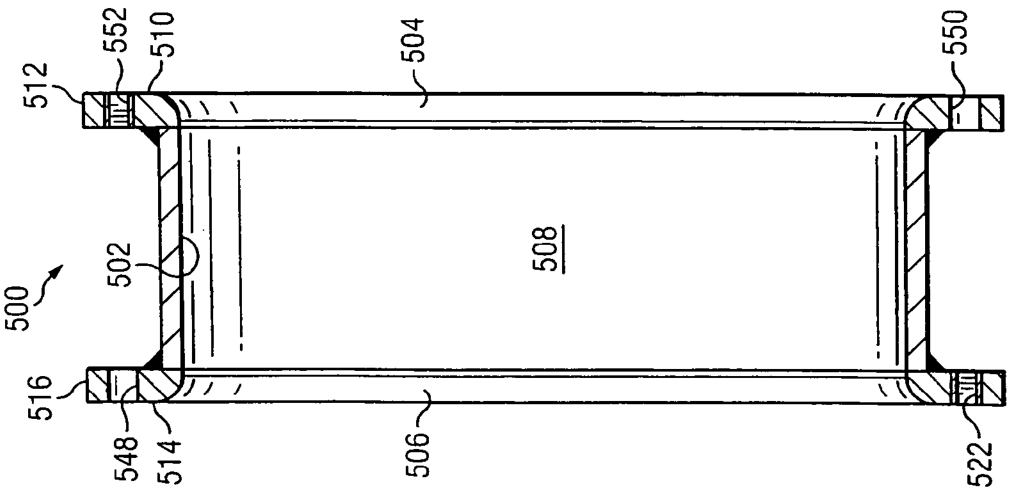
FIG. 5A is cross-sectional view of still another example spacer that may be used with an actuator casing.

FIGS. 5A and 5B depict yet another example spacer 500 that may be used instead of the spacer 102 shown in FIG. 1. The example spacer 500 is generally ring-shaped and includes a cylindrical portion 502 that, when assembled to the casings 106 and 108 forms part of the actuator casing 104. The example spacer 500 also includes first and second flanges 504 and 506 that project outwardly or away from the central opening or longitudinal passage 508 extending from a first circumferential surface 510 at a first end 512 of the first flange 504 to a second circumferential surface 514 at a second end 516 of the second flange 506. The second flange 506 includes a plurality of threaded apertures 518, 520, 522, 524, 526, 528, 530, and 532 and a plurality of non-threaded apertures or clearance holes 534, 536, 538, 540, 542, 544, 546, and 548 that are in an alternating relation to the threaded apertures 518-532. Thus, the apertures 518-548 are circumferentially spaced on the flange 506 about the opening or passage 508. As depicted in FIG. 5B, the apertures 518-548 are equally spaced. However, more or fewer apertures arranged and spaced in different manners could be used instead. Also, similar to the example spacer 200, the first flange 504 includes a plurality of alternating threaded and non-threaded apertures that are shifted relative to the apertures 518-548 so that each of the threaded apertures 518-532 of the circumferential surface 514 of the flange 506 is opposite or coaxially aligned with a non-threaded aperture of the circumferential surface 510 of the flange 504. Likewise, each of the non-threaded apertures 534-548 is opposite or coaxially aligned with a threaded aperture of the circumferential surface 510 of the flange 504. For example, as shown in FIG. 5A, the threaded aperture 522 is opposite or coaxially aligned with a non-threaded aperture 550 of the circumferential surface 510 of the flange 504 and the non-threaded aperture 548 is opposite or coaxially aligned with a threaded aperture 552 of the circumferential surface 510 of the flange 504.

In contrast to the example spacers 102, 200, and 300, the example spacer 500 has outwardly projecting flanges 504 and 506 and, thus, substantially exposes (to the environment external to the actuator casing 104) the threaded fasteners used to assemble the casings 106 and 108 to the spacer 500. Exposure of the fasteners in this manner may facilitate field replacement of the fasteners in the event that a fastener becomes damaged, weakened (e.g., via corrosion), or otherwise requires replacement.

The example spacers 102, 200, 300, and 500 described above may be made substantially of metal(s) using a machining process, a casting process, and/or a forging process. In the case of the example spacers 300 and 500, the flanges 304, 306, 504, and 506 may be separately fabricated from, for example, metal plate and attached (e.g., via welding) to a cylindrical structure (e.g., a piece of pipe) to form a substantially unitary or one-piece ring-shaped structure. Alternatively, the example spacers 300 and 500 could be partially formed using a casting or forging process and then machined to a finished form or may be formed by machining a solid block of metal, thereby eliminating the need to separately fabricate and attach flanges. In other words, the flanges may be integrally formed with the finished spacer to eliminate the need for additional fabrication and processing associated with separately formed flanges. Additionally, the threaded apertures used in the example spacers 102, 200, 300, and 500 may be tapped threads, thread inserts such as helicoil inserts, or may be implemented using any other process and/or device that provides internal threads.

Figure 6A:
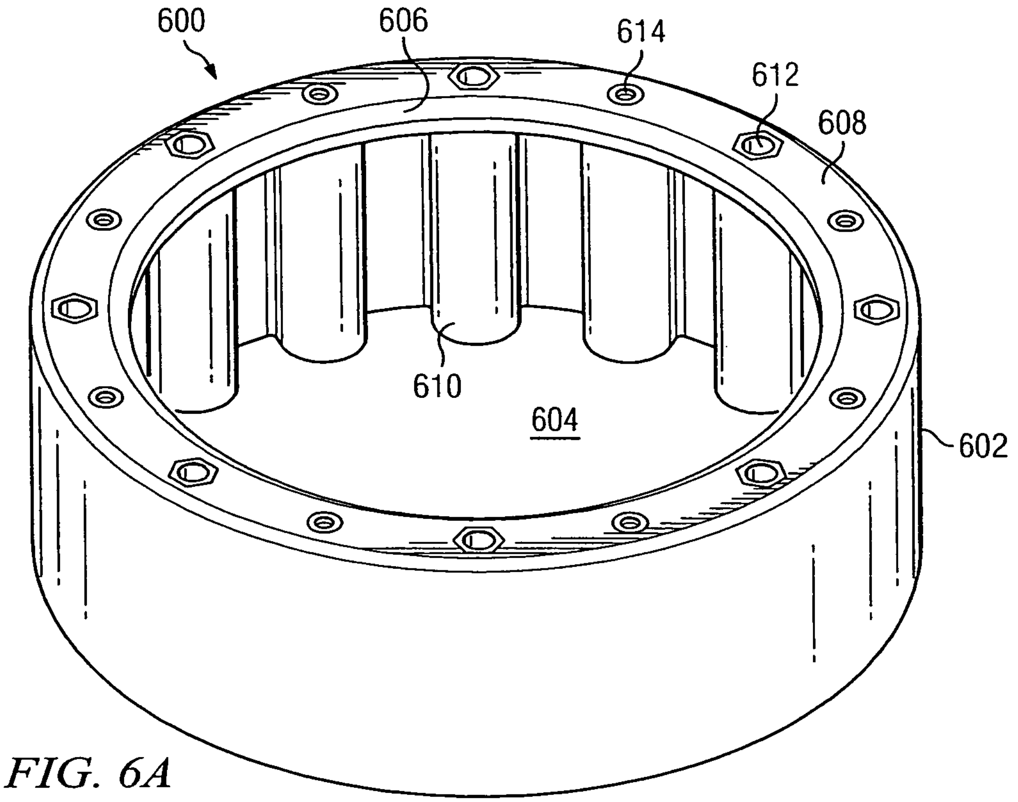
FIG. 6A is an isometric view of another example spacer having a plastic body and removable threaded metal inserts.
Figure 6B:
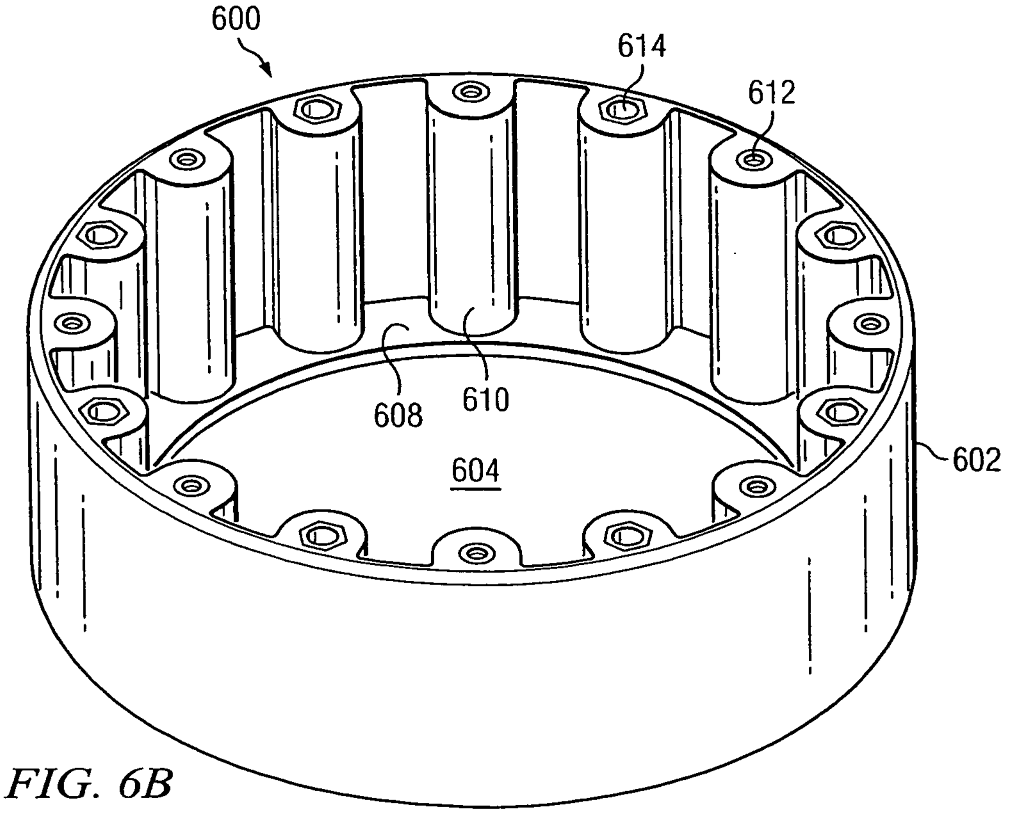
FIG. 6B is another isometric view of the example spacer of FIG. 6A.

FIGS. 6A and 6B depict yet another alternative example spacer 600 that may be used instead of the example spacer 102 of FIG. 1. In contrast to the example spacers 102, 200, 300, and 500 described above, the example spacer 600 is made substantially of plastic (e.g., via an injection molding process) and utilizes threaded metallic inserts to provide internally threaded apertures for the threaded fasteners used to assemble the casings 106 and 108 to the spacer 600. Turning in more detail to FIGS. 6A and 6B, the example spacer 600 includes a ring-shaped or cylindrically-shaped member or body 602, which is made of a plastic material (e.g., a thermoplastic material) suitable for use in the intended application for the example actuator 100. The ring-shaped member or body 602 defines a central opening or longitudinal passage 604 and has an inwardly projecting (i.e., inwardly toward the opening 604) flange 606. The flange 606 has a circumferential surface 608 that is configured to sealingly engage the diaphragm 128 when the spacer 600 is coupled to the casings 106 and 108. In contrast to the example spacers 102, 200, 300, and 500, the example spacer 600 includes only one flange-like structure (i.e., the flange 606) to enable fabrication of the spacer 600 via an injection molding process. In particular, eliminating a flange-like structure at one end of the spacer 600 enables an injection molding tool component to be pulled away from the spacer 600.

The example spacer 600 also includes a plurality of cylinder-like projections 610 that are circumferentially spaced about the opening and which project inwardly toward the opening 604. The projections 610 have bores or passages therethrough for receiving a respective plurality of threaded metal inserts (two of which are indicated at reference numerals 612 and 614). The threaded metal inserts 612 and 614 are preferably, but not necessarily, removably inserted into the bores or passages in the projections 610 after the body 602 has been fabricated (e.g., injection molded). In this manner, one or more of the threaded metal inserts 612 and 614 can be replaced, if needed, to repair the spacer 600. Additionally, the body 602 and the inserts 612 and 614 are sized so that a substantial portion of the compressive forces to which the spacer 600 is subject when assembled within the casing 104 is transmitted through the metal inserts 612 and 614. As a result, the compressive forces experienced by the plastic body 602 are substantially reduced to prevent deformation or damage to the spacer 600.

Figure 7A:
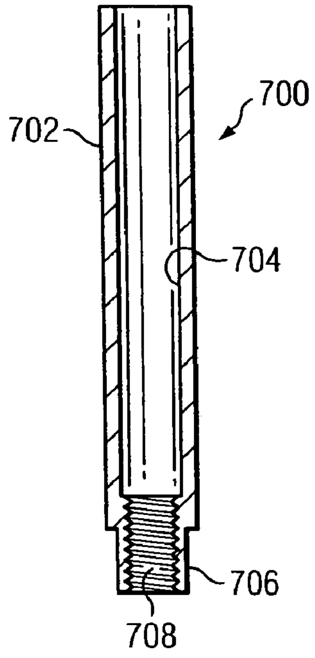
FIG. 7A is a cross-sectional view of an example threaded metal insert that may be used with the example spacer of FIGS. 6A and 6B.
Figure 7B:
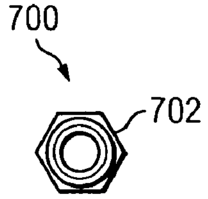
FIG. 7B is a plan view of the example threaded metal insert of FIG. 7A.

An example threaded metal insert 700 shown in FIGS. 7A and 7B may be used to implement the threaded inserts 612 and 614. The example threaded metal insert 700 includes a hex-shaped portion 702 having a clearance passage 704 therethrough and a cylindrical portion 706 having an internally threaded portion 708. The threaded portion 708 is configured to threadingly engage threaded fasteners such as, for example, the threaded bolt 110. As can be seen in FIGS. 6A and 6B, the threaded metal inserts 612 and 614 are arranged so that each hex-shaped end and its associated clearance passage of an insert are adjacent to the threaded end of another insert.

Figure 8C:
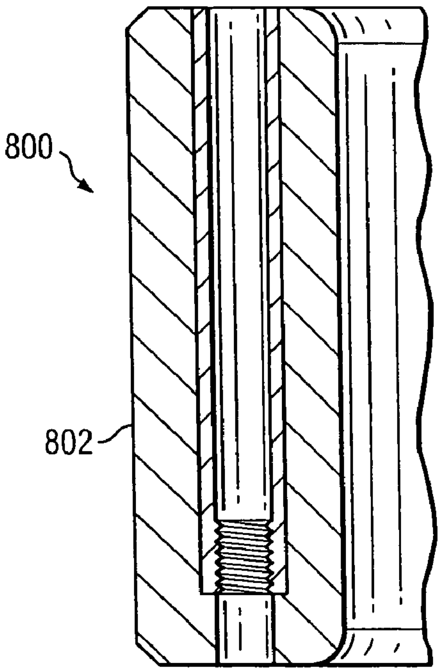
FIG. 8C is another cross-sectional view of the example spacer of FIG. 8A.
Figure 8A:
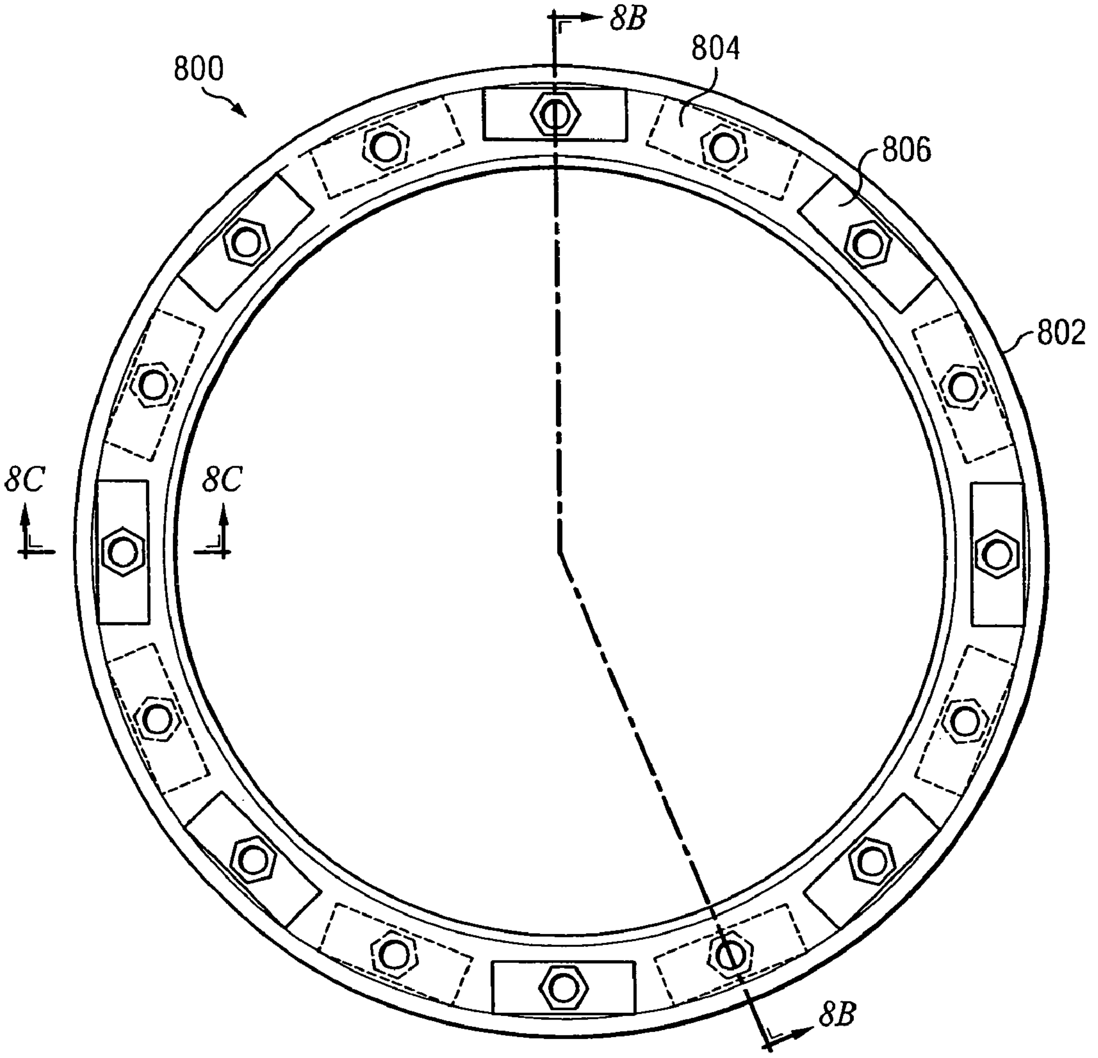
FIG. 8A is a plan view of another example spacer having a plastic body and removable threaded metal inserts.
Figure 8B:
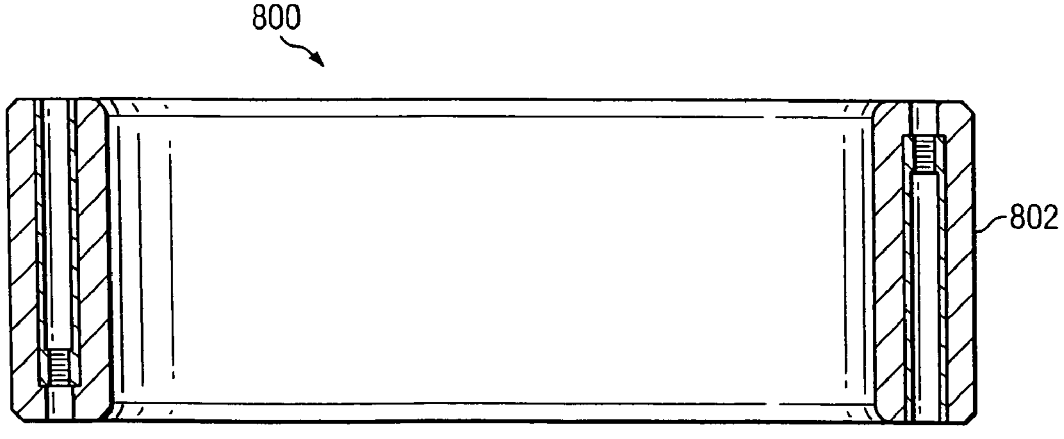
FIG. 8B is a cross-sectional view of the example spacer of FIG. 8A.

FIGS. 8A, 8B, and 8C depict another example spacer 800 that is similar to the example spacer 600. The example spacer 800 includes a ring-shaped or cylindrically-shaped body 802 made substantially of plastic and a plurality of threaded metal inserts (two of which are indicated at reference numerals 804 and 806). However, the threaded metal inserts 804 and 806 used with the example spacer 800 are generally rectangular. The rectangular shape of the metal inserts 804 and 806 enables the body 802 of the spacer to have substantially uniform wall thicknesses to facilitate manufacture (e.g., injection molding) of the plastic body 802.

Figure 9C:
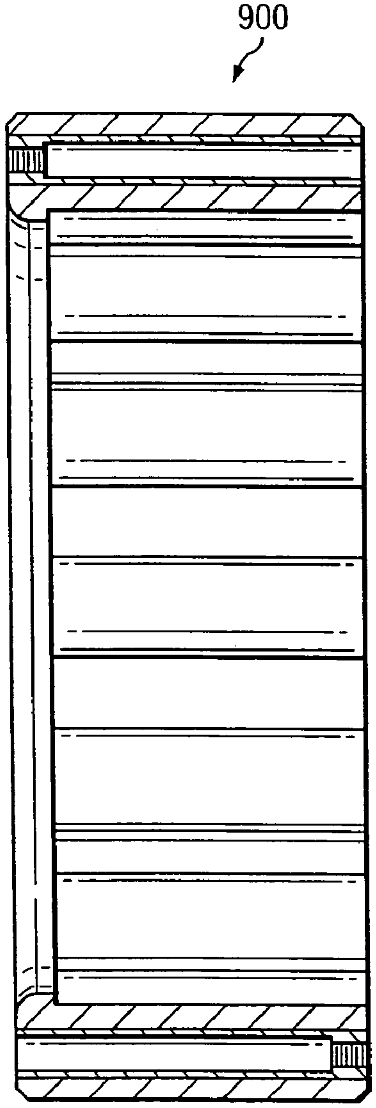
FIG. 9C is a cross-sectional view of the example spacer of FIG. 9A.
Figure 9A:
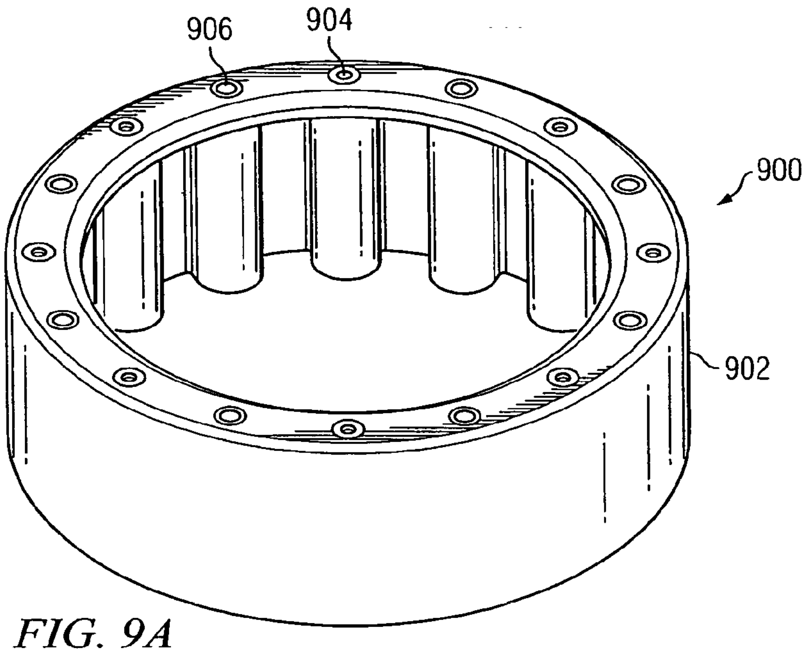
FIG. 9A is an isometric view of an example spacer having a plastic body and non-removable threaded metal inserts.
Figure 9B:
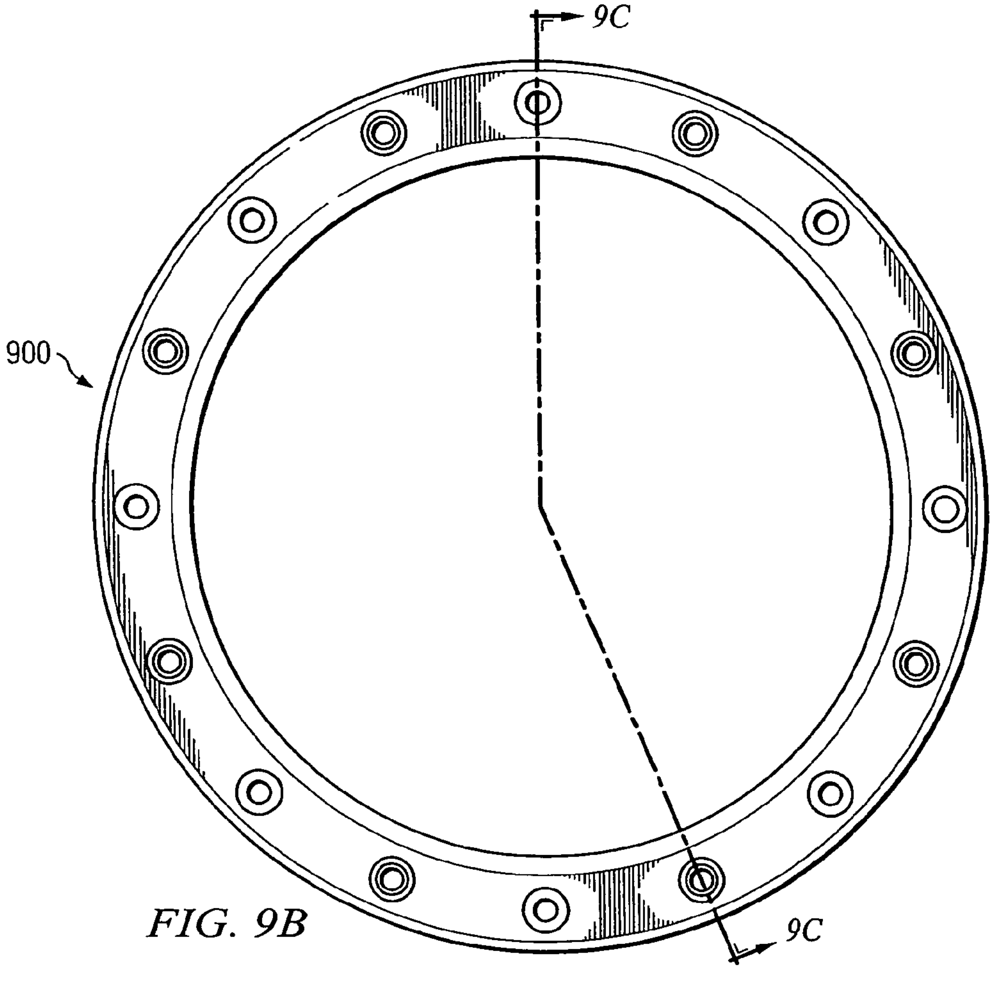
FIG. 9B is a plan view of the example spacer of FIG. 9A.

FIGS. 9A, 9B, and 9C depict another example spacer 900 having a plastic body 902 and non-removable threaded metal inserts (two of which are indicated at reference numerals 904 and 906). The example spacer 900 is similar to the example spacer 600. However, in contrast to the example spacer 600, the threaded metal inserts (e.g., 904 and 906) used with the example spacer 900 are preferably, but not necessarily, insert molded with the plastic body 902 and, thus, are non-removable or not replaceable (i.e., without damage to the body 902). The inserts 904 and 906 are similar to the example insert 700 but are generally cylindrical in shape and may include a knurled surface and/or other outer surface features to better grip the plastic body 902 to prevent rotation of the inserts 904 and 906 during assembly of the spacer 900 to the casings 106 and 108.

Although certain apparatus, methods, and articles of manufacture have been described herein, the scope of coverage of this patent is not limited thereto. To the contrary, this patent covers all embodiments fairly falling within the scope of the appended claims either literally or under the doctrine of equivalents.

What is claimed is:

1. A spacer for use with an actuator casing, comprising:

a cylindrical portion having a first end, a second end, and a longitudinal passage extending between the first and second ends;

a first flange adjacent to the first end; and a second flange adjacent to the second end, wherein the first flange includes a plurality of threaded apertures, each of which is opposite a respective non-threaded aperture in the second flange.

2. A spacer as defined in claim 1, wherein the first flange further comprises a plurality of non-threaded apertures, each of which is opposite a respective threaded aperture in the second flange.

3. A spacer as defined in claim 1, wherein the cylindrical portion forms a part of the actuator casing.

4. A spacer as defined in claim 1, wherein the each of the first and second flanges projects toward the longitudinal passage.

5. A spacer as defined in claim 1, wherein each of the threaded apertures comprises a threaded member inserted into a respective opening in the first flange.

6. A spacer as defined in claim 1, wherein the cylindrical portion and the first and second flanges are substantially unitary.

7. An actuator casing, comprising:

a first casing portion;

a second casing portion; and a spacer coupled between the first and second casing portions, wherein the spacer comprises a plurality of apertures configured to receive fasteners extending through the first and second casing portions; wherein the plurality of apertures comprises a first group of threaded apertures and a second group of non-threaded apertures.

8. An actuator casing as defined in claim 7, wherein the first group of threaded apertures is associated with a first end and a second end of the spacer and the second group of non-threaded apertures is associated with the first end and the second end of the spacer.

9. An actuator casing as defined in claim 8, wherein each of the threaded apertures associated with the first end of the spacer is aligned with a non-threaded aperture associated with the second end of the spacer.

10. An actuator casing as defined in claim 8, wherein the spacer comprises flanges and each flange includes apertures from the first group of threaded apertures and the second group of non-threaded apertures.

11. An actuator casing as defined in claim 10, wherein each of the threaded apertures associated with a first flange is aligned with a respective one of the non-threaded apertures associated with a second flange.

12. An actuator casing as defined in claim 7, wherein the spacer is substantially one-piece.

13. A spacer for use with an actuator casing, the spacer comprising:

a ring-shaped member defining a central opening and configured to form a part of an actuator casing and to space first and second actuator casing portions a predetermined distance when the first and second casing portions are coupled to the ring-shaped member, wherein the ring-shaped member includes a first surface surrounding the central opening configured to engage the first casing portion and a second surface surrounding the central opening configured to engage the second casing portion, and wherein each of the first and second surfaces includes a plurality of apertures configured to receive fasteners to attach the first and second actuator casing portions to the ring-shaped member, wherein a first one of the apertures is a threaded aperture and a second one of the apertures is a non-threaded aperture.

14. A spacer as defined in claim 13, wherein the first one of the apertures is a threaded aperture in the first surface and the second one of the apertures is a non-threaded aperture in the second surface that is coaxially aligned with the first aperture.

15. A spacer as defined in claim 13, wherein the threaded aperture comprises an internally threaded member inserted into an opening in the ring-shaped member.

16. A spacer as defined in claim 15, wherein the threaded member is replaceable after having been inserted into the opening.

17. A spacer as defined in claim 13, wherein the ring-shaped member is made substantially of plastic and wherein the threaded aperture comprises a threaded member made substantially of metal.

18. A spacer as defined in claim 13, wherein a third one of the apertures is a threaded aperture in the second surface and fourth one of the apertures is a non-threaded aperture in the first surface that is coaxially aligned with the third aperture.

19. A spacer as defined in claim 13, wherein at least one of the first and second surfaces is associated with a flange of the ring-shaped member.

20. A spacer as defined in claim 19, wherein the flange is integral with the ring-shaped member.

21. A spacer as defined in claim 19, wherein the flange projects inwardly toward the central opening.

22. A spacer as defined in claim 19, wherein the flange projects outwardly away from the central opening.

23. A spacer as defined in claim 13, wherein the first and second casing portions form at least part of a spring casing.

* * * * *